(12) United States Patent
Patki et al.

(10) Patent No.: US 12,210,770 B1
(45) Date of Patent: Jan. 28, 2025

(54) SYSTEM FOR AUTOMATED DATA RETRIEVAL FROM AN INTEGRATED CIRCUIT FOR EVENT ANALYSIS

(71) Applicant: NVIDIA CORPORATION, Santa Clara, CA (US)

(72) Inventors: Padmanabham Patki, Fremont, CA (US); Jue Wu, Los Gatos, CA (US); Andrew Elias, Ottawa (CA); Smbat Tonoyan, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/372,773

(22) Filed: Sep. 26, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 5,671,235 A | * | 9/1997 | Bosch | G06F 11/3656 |
| | | | | 714/E11.214 |
| 2023/0412265 A1 | | 12/2023 | Bakopoulos et al. | |

FOREIGN PATENT DOCUMENTS

GB  2290877 A  *  1/1996  .....  G01R 31/318561

OTHER PUBLICATIONS

Oron et al., Pending U.S. Appl. No. 18/120,802, filed Mar. 13, 2023.
Patronas et al., Pending U.S. Appl. No. 18/083,981, filed Dec. 19, 2022.
Patronas et al., Pending U.S. Appl. No. 17/982,827, filed Nov. 8, 2022.
Patronas et al., Pending U.S. Appl. No. 17/982,895, filed Nov. 8, 2022.

* cited by examiner

*Primary Examiner* — Brian R Peugh
(74) *Attorney, Agent, or Firm* — Anup Lyer; Moore & Van Allen PLLC

(57) ABSTRACT

Systems, computer program products, and methods are described herein for automated data retrieval from an integrated circuit (IC). An example system receives an alert indicating a trigger event associated with the IC; extracts, using a scan island (e.g., a partition of the IC that is isolated for data retrieval), data from a plurality of scan chains and a plurality of random-access memories (RAMs) associated with the IC in response to receiving the alert; stores the data in an external non-volatile storage media; and reboots the IC upon storing the data in the external non-volatile storage media. In this way, embodiments of the present invention offer a scalable and secure method for real-time data extraction and processing in the event of an integrated circuit malfunction, improving diagnostics while ensuring cost-effectiveness and data security.

26 Claims, 7 Drawing Sheets

SYSTEM FOR AUTOMATED DATA RETRIEVAL FROM AN INTEGRATED CIRCUIT FOR EVENT ANALYSIS

TECHNOLOGICAL FIELD

Example embodiments of the present disclosure relate generally to event analysis and, more particularly, to a scalable and secure method to retrieve data from an integrated circuit (IC) in response to a trigger event.

BACKGROUND

Data centers, integral to modern computing infrastructure, rely heavily on integrated circuits (ICs) within their server farms. These ICs, composed of multiple cores running diverse loads, can lead to unpredictable crashes that are difficult to diagnose. Traditional methods, such as using Reliability, Availability, and Serviceability (RAS) records, often prove inadequate for helping users understand crash details. In portable computing devices, the constraints of cost and complexity limit the options for troubleshooting. Meanwhile, in server farms, solutions like Baseboard Management Controllers (BMCs) present their own challenges, including potential security vulnerabilities. The existing solutions are thus found to be either inadequate, slow, unsecure, or expensive, leading to a pressing need for more effective approaches to manage and diagnose system failures in various computing environments.

Applicant has identified a number of deficiencies and problems associated with crash analysis. Many of these identified problems have been solved by developing solutions that are included in embodiments of the present disclosure, many examples of which are described in detail herein.

BRIEF SUMMARY

Systems, methods, and computer program products are therefore provided for automated data retrieval from an integrated circuit (IC).

In one aspect, a system for automated data retrieval from an integrated circuit (IC) is present. The system comprising: a processing device configured to communicate with the IC; a non-transitory storage device containing instructions that, when executed by the processing device, cause the processing device to: receive an alert indicating a trigger event associated with the IC; extract, using a scan island, data from a plurality of scan chains and a plurality of random-access memories (RAMs) associated with the IC in response to receiving the alert; and store the data in an external non-volatile storage media, wherein the scan island is a partition of the IC that is isolated for data retrieval.

In some embodiments, the trigger event comprises at least a malfunction of the IC.

In some embodiments, the data comprises information associated with the trigger event, wherein the information comprises at least one of information associated with the IC, a debug configuration state of the IC, a configuration state of one or more components of the IC, firmware and/or software measurements of the one or more components of the IC, an error state, or configuration information associated with the scan island.

In some embodiments, the instructions, when executed by the processing device, further cause the processing device to: reboot the IC upon storing the data in the external non-volatile storage media.

In some embodiments, the instructions, when executed by the processing device, further cause the processing device to: determine whether the reboot is in response to the trigger event; and transmit the data from the external non-volatile storage media to an original equipment manufacturer (OEM) server for post-event analysis in an instance in which the reboot is in response to the trigger event.

In some embodiments, the instructions, when executed by the processing device, further cause the processing device to: determine that a first portion of the data is associated with a first user; mask, using the scan island, the first portion of the data upon determining that the first portion of the data is associated with the first user, wherein the first portion of the data is masked using a dynamic mask pattern generator, wherein the first portion of the data is dynamically masked during extraction of the data; and store the data in an external non-volatile storage media, wherein the first portion of the data is masked.

In some embodiments, the instructions, when executed by the processing device, further cause the processing device to: determine a first subset of scan chains and a first subset of RAMs associated with the first portion of the data; bypass the first subset of scan chains and the first subset of RAMs when extracting the data upon determining that the first portion of the data is associated with the first user; and store the data in an external non-volatile storage media, wherein the first portion of the data is excluded.

In some embodiments, the instructions, when executed by the processing device, further cause the processing device to: determine, using a data security module, whether the first user is authorized to access the first portion of the data; and transmit the first portion of the data to the first user in an instance in which the first user is authorized to access the first portion of the data, wherein the data security module is associated with the scan island.

In some embodiments, the instructions, when executed by the processing device, further cause the processing device to: establish, using the data security module, a network session with the first user upon determining that the first portion of the data is associated with the first user; transmit, via the network session, a request to the first user to submit an authentication token to access the first portion of the data, wherein the request comprises a unique identifier associated with the IC and a session identifier associated with the network session; receive, via the network session, the authentication token from the first user in response to the request; validate, using the data security module, the authentication token following receipt of the authentication token; and determine that the first user is authorized to access the first portion of the data based on at least validating the authentication token.

In some embodiments, the authentication token comprises at least one of the session identifier, the unique identifier, a first set of parameters for extraction of the data, or a digital signature of the first user, wherein the digital signature of the first user is generated using a first private key associated with the first user.

In some embodiments, the instructions, when executed by the processing device, further cause the processing device to: extract, using a data extraction module, the first portion of the data based on at least the first set of parameters upon receiving the alert; generate, using the data security module, an encryption key; encrypt, using the data security module, the first portion of the data using the encryption key; encrypt, using the data security module, the encryption key using a first public key associated with the first user; and transmit the encrypted first portion of the data and the encrypted encryption key to the first user.

In some embodiments, the instructions, when executed by the processing device, further cause the processing device to: attest the first portion of the data prior to encrypting the first portion of the data using the encryption key, thereby ensuring integrity of the data.

In some embodiments, the instructions, when executed by the processing device, further cause the processing device to: determine that one or more portions of the data is associated with one or more users; determine, using the data security module, whether the one or more users is authorized to access the one or more portions of the data; and transmit the one or more portions of the data to the one or more users in an instance in which the one or more users is authorized to access the one or more portions of the data.

In some embodiments, the instructions, when executed by the processing device, further cause the processing device to: filter the data, using a data processing module, based on at least security and isolation policies associated with the scan island; and reformat the data, using the data processing module, from an initial format to a standardized format upon filtering the data, wherein the data processing module is associated with the scan island.

In some embodiments, the instructions, when executed by the processing device, further cause the processing device to: compress the data, using a data compression module, thereby reducing a size of the data, wherein the data compression module is associated with the scan island.

In another aspect, a method for automated data retrieval from an integrated circuit (IC) is presented. The method comprising: receiving an alert indicating an instance of a trigger event associated with the IC; extracting, using a scan island, data from a plurality of scan chains and a plurality of random-access memories (RAMs) associated with the IC in response to receiving the alert; and storing the data in an external non-volatile storage media, wherein the scan island is a partition of the IC that is isolated for data retrieval.

In yet another aspect, a computer program product for automated data retrieval from an integrated circuit (IC) is presented. The computer program product comprising a non-transitory computer-readable medium comprising code configured to cause an apparatus to: receive an alert indicating an instance of a trigger event associated with the IC; extract, using a scan island, data from a plurality of scan chains and a plurality of random-access memories (RAMs) associated with the IC in response to receiving the alert; and store the data in an external non-volatile storage media, wherein the scan island is a partition of the IC that is isolated for data retrieval.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
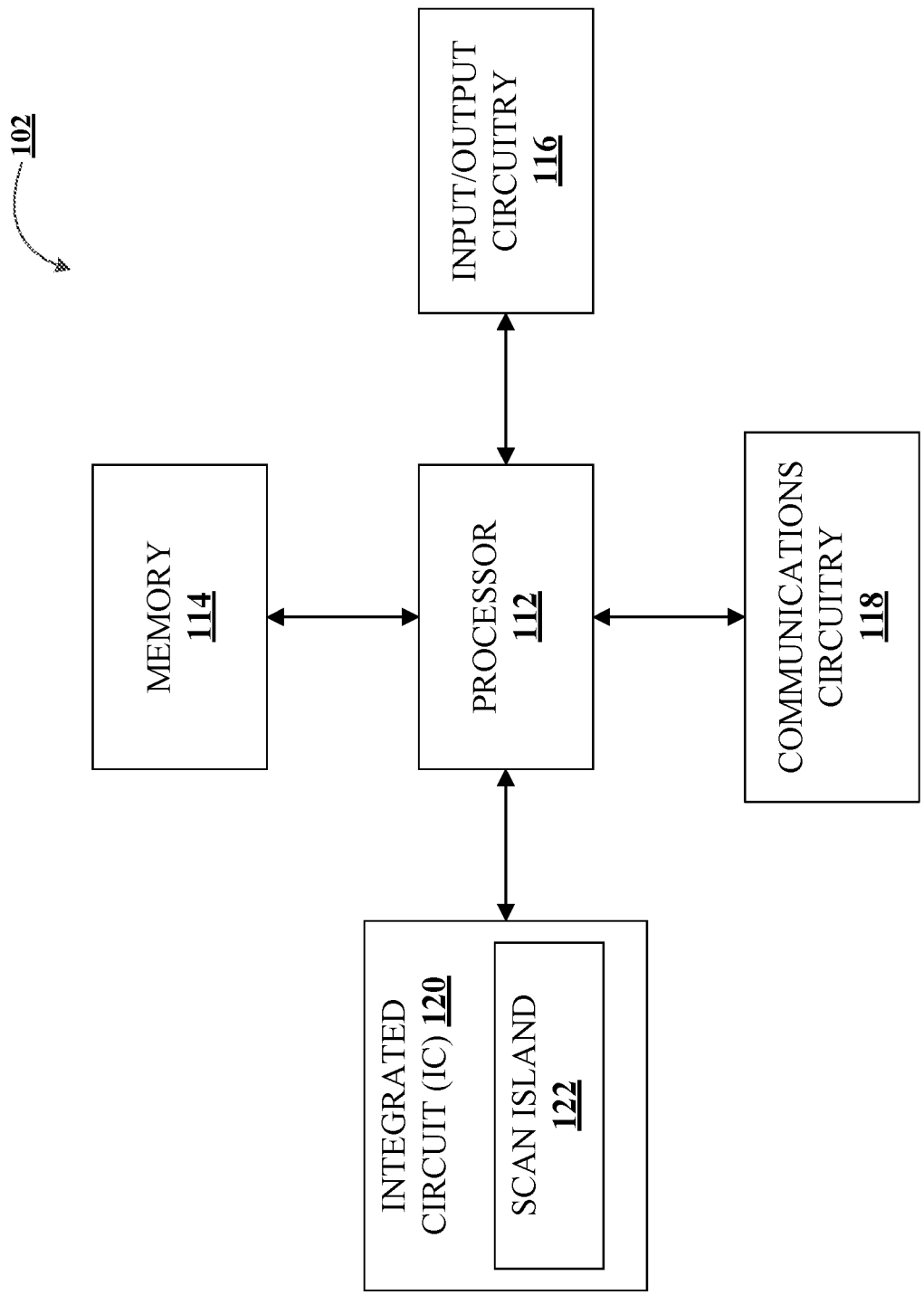
FIG. 1 illustrates an example system circuitry for automated data retrieval from an integrated circuit (IC), in accordance with an embodiment of the present invention.

Data centers often utilize a significant number of integrated circuits (ICs) within their server farms. These ICs are made up of multiple cores running diverse loads simultaneously, which can lead to unpredictable crashes that are challenging to replicate or diagnose. The standard approach of using Reliability, Availability, and Serviceability (RAS) records, which contain minimal register and error code details, usually falls short when providing a comprehensive understanding of crash details and depends heavily on the replication of the issue. As a result, resources may be unavailable for extended periods while investigators attempt to identify the underlying cause of the problem. Expanding the number of registers and records is not a practical solution, as it presumes a precognitive understanding of potential failures.

In computing environments such as laptops or portable devices, product cost significantly influences the platform design. Incorporating complicated external microcontrollers is not a viable option due to their expense. These systems are often used in real-world settings where the typical user either lacks the ability or the financial means to employ sophisticated tools to troubleshoot a system failure. Requiring the system to be taken to a service station for comprehensive analysis can be a drawn-out process, leading to a poor user experience due to the time and inconvenience factors involved.

In server farms, Baseboard Management Controllers (BMCs) can be used on platforms to execute basic telemetry and recovery operations. Nonetheless, BMCs are generally simpler and potentially less secure as compared to the IC. Differences in security policies, trust levels, and ownership among the BMC, the primary processor vendor, and the data center owner add complexities to the management data extracted from the IC. Additionally, these scenarios are vulnerable to man-in-the-middle attacks if the data is extracted in a remote environment, posing a security risk to all parties involved, including the original equipment manufacturer (OEM). Therefore, the existing solutions, being either inadequate, slow, unsecure, or expensive, are not practical for large-scale deployment in remote systems.

Embodiments of the invention present a scalable and secure method to retrieve data from an IC in response to a trigger event (e.g., an IC malfunction), as well as techniques for the processing and transmission of the data while ensuring confidentiality requirements are met. To this end, embodiments of the present invention use a scan island-a specific area within the IC that is isolated to ensure uninterrupted functionality—to perform specific operations in response to a trigger event. The scan island may include a data extraction module that is configured to extract data associated with the IC when a trigger event occurs. In addition, the scan island may include a data security module that is used to enable a fine-tuned exclusion and/or masking of data depending on the dynamically changing boundaries and asset distribution within the IC at any given time. The data security module may be used to ensure permissioned access based on data ownership among multiple users. The data security module may also be used to attest the extracted data to prevent spoofing attacks on the extracted data. In example embodiments, the scan island may include a data filtering module and a data compression module to further facilitate the processing of data. Once processed, the data is then stored in a non-volatile storage media for distribution. Upon storing the data in the non-volatile storage media, the IC is rebooted. When rebooting, embodiments of the invention determine whether the IC reboot is in response to the trigger event. If the reboot is in response to the trigger event, the data from the non-volatile storage media is transmitted to the authorized parties, such as an OEM server, for post-event analysis.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based on at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

As used herein, the term "first" is not intended to impart a numerical or serial limitation. Instead, the term "first" is used solely to distinguish or identify a particular element or set of elements from other similar elements within the context of the invention. For example, the term 'first user' may refer to one particular user, who may be the sole user or one user among a plurality of users, and does not signify any particular sequence, order, or hierarchy among the users.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example System Circuitry

FIG. 1 illustrates a schematic block diagram of example system circuitry, some, or all of which may be included in the system 102. As shown in FIG. 1, the system 102 may include a processor 112, a memory 114, input/output circuitry 116, communications circuitry 118, and an IC 120.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the system 102 may be housed together, while other components are housed separately (e.g., a controller in communication with the system 102).

While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the system 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., system 102, to carry out various functions in accordance with example embodiments of the present disclosure.

Although illustrated in FIG. 1 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 may be configured to buffer data for processing by the processor 112. Additionally, or alternatively, in at least some embodiments, the memory 114 may be configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 1 as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like. The input/output circuitry 116 may be used by a user to view and/or adjust likelihood of malfunction indications (e.g., a user may indicate whether a malfunction has been resolved via the input/output circuitry).

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the system 102 may be implemented as an end-user machine or other type of device designed for complex user interactions. In some embodiments (like other components discussed herein), the input/output circuitry 116 may be eliminated from the system 102. The input/output circuitry 116 may be in communication with memory 114, communications circuitry 118, and/or any other component(s), such as via a bus. Although more than one input/output circuitry and/or other component can be included in the system 102, only one is shown in FIG. 1 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the IC 120. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna (e) or to handle receipt of signals received via the antenna (e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of system 102, such as via a bus. The communication circuitry 118 of the system 102 may also be configured to receive and transmit information with the IC 120 and components associated therewith.

In some embodiments, the IC 120 may refer to a complex arrangement of electronic circuits designed to perform specific functions. The IC 120 may include one or more processors, memory modules, communication interfaces, and other essential elements that enable the execution of various tasks within the system 102. Although illustrated in FIG. 1 as a single integrated circuit, the IC 120 may encompass a plurality of interconnected circuits or modules. These may be embodied on a single chip or distributed across multiple chips. The design of the IC 120 may include provisions for specific tasks such as data processing, signal processing, encryption, or error correction, depending on the intended use and application of the IC.

In some embodiments, the IC 120 may include a scan island 122. The scan island 122, as part of the IC 120, may represent a specialized section or module designed to facilitate the testing and analysis of the IC. Unlike other components within the IC 120, the scan island 122 may be specifically configured to enable access to internal states of the IC via associated scan chains and RAMs, providing a means to monitor, diagnose, or evaluate the behavior of the circuit. In specific embodiments, the scan island 122 may be configured to access a series of interconnected scan cells or registers (referred to herein as scan chains) associated with the IC 120. Such an arrangement allows for the sequential scanning of data through the cells, enabling the observation and control of individual elements within the IC 120. The scan island 122 may be used to perform various testing procedures, such as fault detection, performance analysis, or validation of the IC's functionality.

The scan island 122 may interface with the system 102 through specific communication pathways, allowing for the extraction of data or the injection of test patterns. This interaction may be facilitated by at least the processor 112, communications circuitry 118 and/or the input/output circuitry 116 within the system 102, ensuring a secure and efficient connection with the IC 120. Although depicted as a singular entity within the IC 120, the scan island 122 may include multiple interconnected sections or modules, each designed to target specific aspects of the IC 120. The design and configuration of the scan island 122 may vary based on the specific requirements of the IC 120, reflecting the complexity of the tasks it is intended to perform.

In some embodiments, the system 102 may include hardware, software, firmware, and/or a combination of such components, configured to execute various processes and methods described herein. It should be appreciated that in some embodiments, the IC 120 (including the scan island 122) may perform one or more of such example actions in combination with another circuitry of the system 102, such as the memory 114, processor 112, input/output circuitry 116, and communications circuitry 118. For example, in some embodiments, the IC 120 may utilize processing circuitry, such as the processor 112 and/or the like, to form a self-contained subsystem to perform one or more of its corresponding operations. In this regard, some or all of the example processes and algorithms discussed herein can be performed by at least one processor 112 and/or the IC 120.

In various embodiments described herein, non-transitory computer readable storage media can be configured to store firmware, one or more application programs, and/or other software, which include instructions and/or other computer-readable program code portions that can be executed to direct operation of the system 102 to implement various operations, including the examples shown herein. As such, a series of computer-readable program code portions may be embodied in one or more computer-program products and can be used, with a device, system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example Scan Island

Figure 2:
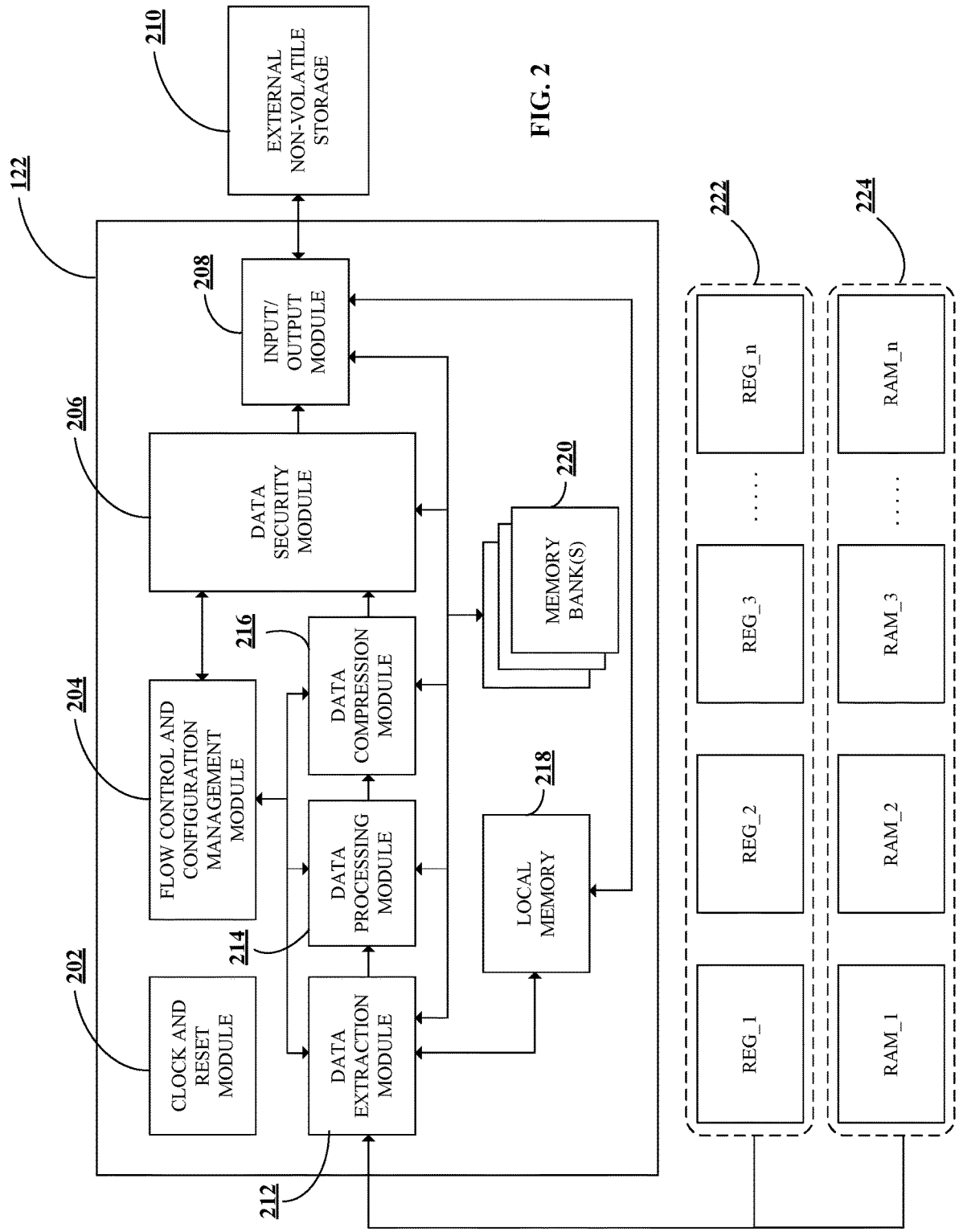
FIG. 2 illustrates an example scan island and various modules associated therewith, in accordance with an embodiment of the present invention.

FIG. 2 illustrates an example scan island 122 and various modules associated therewith, in accordance with an embodiment of the present invention. The scan island 122 may be a region within the IC, provisioned with the unique capability to isolate itself from the rest of the IC to prevent interference from any signals required for the contained execution of its function. Such isolation ensures that the logic within the scan island is not corrupted by the rest of the IC when those regions are scanned, allowing the logic in the scan island to remain operational. As shown in FIG. 2, the scan island 122 may include a clock and reset module 202, a flow control and configuration management module 204, a data security module 206, an input/output module 208, a data extraction module 212, a data processing module 214, a data compression module 216, a local memory 218, and memory bank(s) 220 to perform operations when a trigger event occurs. While the foregoing description outlines a specific set of modules within the scan island 122, it should be understood that the actual configuration may vary, including fewer or additional modules, depending on various factors and requirements.

While the term "module" should be understood broadly to encompass a distinct functional unit within a system, in some embodiments, the term "module" may include both hardware and software components that collectively perform a specific function or set of functions. For example, in some embodiments, a "module" may include processing circuitry, algorithms, routines, storage media, network interfaces, input/output mechanisms, and the like. In some embodiments, other elements of the system may interact with or supplement the functionality of a particular module. For example, the clock and reset module 202 may synchronize the operations of other modules, the data security module 206 may ensure the integrity of data processed by other modules, and the like. The term "module" may thus represent a cohesive and purpose-driven element within the system, capable of operating independently or in conjunction with other modules to achieve the desired outcomes.

As shown in FIG. 2, the clock and reset module 202 may be responsible for managing the timing and synchronization of the various modules associated with the scan island 122. In example embodiments, the clock and reset module 202 may generate and distribute the necessary clock signals to coordinate the operations of the other modules within the scan island, ensuring that they function in harmony. This includes a free-running independent clock that can toggle independently of any on-chip activity, providing continuous operation even in the event of a crash. Additionally, the reset functionality associated with the clock and reset module 202 includes a local reset capable of self-assertion and de-assertion. This allows for the initialization or reinitialization of the scan island 122, ensuring that it starts or restarts in a known state, and places the scan island in a "clean" state after a crash event, enabling the continued functionality of the scan island's logic.

As shown in FIG. 2, the flow control and configuration management module 204 may be configured to oversee the control and direction of data flow within the scan island 122. In example embodiments, the flow control and configuration management module 204 may manage the configuration settings for the various modules (e.g., a data security module 206, an input/output module 208, a data extraction module 212, a data processing module 214, and/or a data compression module 216), allowing for customization and optimization of their respective functions. The flow control and configuration management module 204 may be configured to ensure that data is routed correctly between the different stages of processing, maintaining efficiency and adherence to specified operational parameters.

As shown in FIG. 2, the data extraction module 212 may serve as the initial stage of data retrieval within the scan island 122, performing specific operations in response to a trigger event, such as an IC malfunction. In example embodiments, the data extraction module 212 may be configured to extract data associated with the IC 120, including information from a number of registers, referred to as scan chains 222, and RAMs (e.g., RAM_1, RAM_2, . . . , RAM_n 224).

The scan chains 222 may be a series of interconnected registers REG_1, REG_2, . . . , REG_n that enable the controlled shifting of data within the IC 120. The scan chains 222 may be used during the data extraction process, allowing for the precise retrieval of information from various parts of the IC 120. The scan chains 222 may be configured to capture specific data patterns, states, or conditions within the IC, providing valuable insights into its operation, performance, or potential issues. As such, the scan chains 222 play an important role in the diagnostic and monitoring capabilities of the scan island 122, facilitating the targeted extraction of data in response to trigger events or other operational needs. In some embodiments, the scan chains 222 may be routed through the rest of the IC, allowing registers with similar exposure permission to be grouped in common chains, while those with dissimilar exposure are grouped in different scan chains. In this regard, in example embodiments, fuses can be used to prevent data from certain chains from appearing on scan chains depending on IC manufacturer, OEM, or end user requirements.

The RAMs RAM_1, RAM_2, . . . , RAM_n 224 may serve as volatile storage for the IC 120 during operation. When a trigger event occurs, the data within the RAMs 224 is extracted along with the data from the scan chain 222. The data extraction provides a snapshot of the state of the IC at the time of the malfunction, capturing valuable information about the conditions, variables, and processes that were active when the issue occurred. In some embodiments, the data extracted from the RAMs may include variables, buffers, temporary calculations, and other transient information that reflects the dynamic operation of the IC 120. By analyzing this data, analysts can gain insights into the underlying cause of the malfunction, identify patterns or anomalies, and develop targeted solutions or preventative measures. Similar to implementing exposure-based chain segregation, differing policies may be applied for on-chip RAM segregation for data management to allow for data isolation and concealment as needed during RAM dump.

Once the data is extracted, it may be further processed by other modules within the scan island 122, such as the data processing module 214 and the data compression module 216, before being stored in non-volatile storage media for distribution. The data extraction module 212 thus plays a central role in the scalable and secure method of retrieving data from the IC 120, acting as the starting point for the entire process.

As shown in FIG. 2, the data processing module 214 may be configured to filter and reformat the data extracted using the data extraction module 212. In example embodiments, the data processing module 214 may apply security and isolation policies to filter the data, ensuring that only relevant information is retained. Additionally, the data processing module 214 may be configured to reformat the data from its initial format to a standardized format, preparing it for subsequent stages of processing.

As shown in FIG. 2, the data compression module 216 may be configured to compresses the data, thereby reducing its size. Such compression may be essential for efficient storage and transmission, particularly when dealing with large amounts of data. The data compression module 216 may employ various algorithms and techniques to achieve optimal compression rates without significant loss of information. By minimizing the data footprint, the compression module 216 may facilitate faster transmission to off-chip destinations and more efficient utilization of storage resources within the IC 120. Furthermore, the data compression module 216 may work in conjunction with other modules, such as the data extraction and data security modules, to ensure that the compressed data retains its integrity and relevance.

As shown in FIG. 2, the data security module 206 may be configured to protect the confidentiality and integrity of the data extracted from the IC. In example embodiments, the data security module 206 may be configured to enable fine-tuned exclusion and/or masking of data, adapting to the dynamically changing boundaries and asset distribution within the IC 120 at any given time. Such adaptability ensures permissioned access based on data ownership among multiple users, thereby providing a robust layer of security. In addition, the data security module 206 may be configured to attest and encrypt the extracted data, preventing spoofing attacks and ensuring that the data's authenticity is maintained. The attestation process verifies the source and integrity of the data, adding an additional layer of trust to the information being processed.

As shown in FIG. 2, the input/output module 208 may facilitate the communication between the scan island 122 and external devices or systems (e.g., system 102). In this regard, the input/output module 208 may manage the transmission of encrypted and attested data to off-chip destinations, as well as the reception of any necessary inputs. Furthermore, the input/output module 208 may ensure that data is transmitted and received in a controlled and secure manner, in accordance with the required protocols and standards.

As shown in FIG. 2, the local memory 218 and memory bank(s) 220 may provide storage capabilities within the scan island 122 and enable efficient data transfers and concurrent execution of different pipeline stages. In example embodiments, the local memory 218 within the scan island 122 may be specifically configured for storing patterns and other information required for the data extraction operation. This includes, but is not limited to, templates, algorithms, configurations, and parameters that guide the data extraction process. By housing this essential information, the local memory 218 ensures that the data extraction module 212 has immediate access to the resources needed to perform its functions efficiently and accurately. In example embodiments, the memory bank(s) 220 may provide additional storage capabilities within the scan island 122. The memory bank(s) 220 may be used to store the extracted, processed, or compressed data, as well as any other information relevant to the operations of the scan island. In this way, the memory bank(s) 220 offer flexibility in terms of storage capacity and access speed, allowing for the optimization of data handling within the scan island 122.

As shown in FIG. 2, the external non-volatile storage media 210 may be configured to preserve the data extracted from the IC 120, including information from both the scan chains (registers REG_1, REG_2, . . . , REG_n 222) and the RAMs RAM_1, RAM_2, . . . , RAM_n 224. As such, the external non-volatile storage media 210 may serve as the final repository for the data extracted in response to a trigger event, such as an IC malfunction. Once the data has been extracted, processed, compressed, and secured by the various modules within the scan island, it is stored in the non-volatile storage media 210 for subsequent analysis, transmission, or archival. In example embodiments, the external non-volatile storage media 210 may include various types of storage devices, such as solid-state drives, hard disk drives, flash memory, or other forms of persistent storage.

Example Data Flow Diagram of the Scan Island

Figure 3:
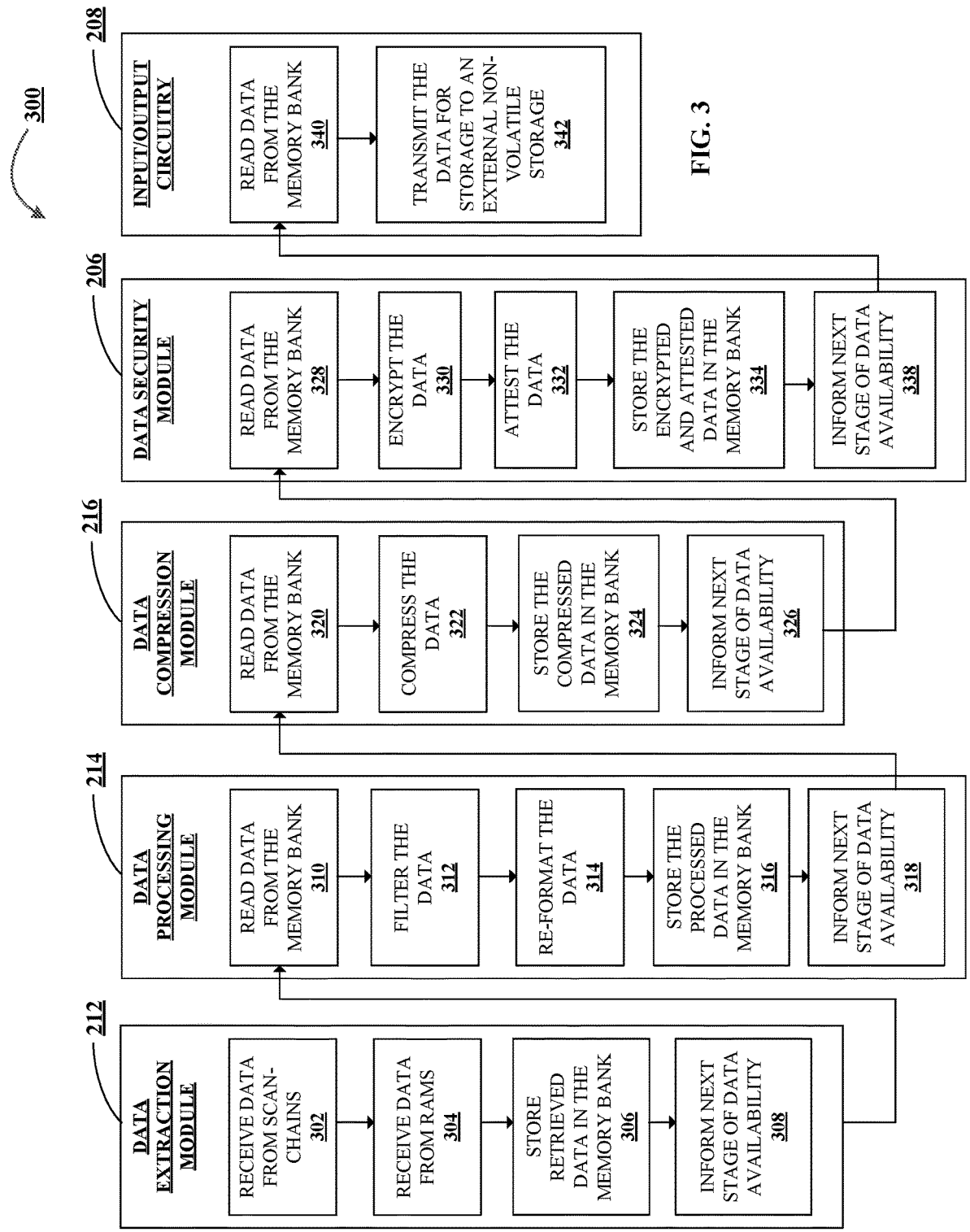
FIG. 3 illustrates an example data flow diagram for a scan island, in accordance with an embodiment of the invention.

FIG. 3 illustrates an example data flow diagram 300 for the scan island (e.g., the scan island 122 shown in FIG. 2), in accordance with an embodiment of the invention. As described herein, the data extraction module 212 may be configured to extract data associated with the IC 120. At step 302, the data extraction module 212 may extract specific information from the interconnected registers (REG_1, REG_2, . . . , REG_n), also referred to as scan-chains. In some embodiments, the information may provide insights into various operational states and conditions within the IC. Next, at step 304, the data extraction module 212 may proceed to receive data from the RAMs (RAM_1, RAM_2, . . . , RAM_n). In some embodiments, the data may reflect the dynamic operation of the IC at the time of extraction. Following the retrieval from both scan chains and RAMs, at step 306, the data extraction module 212 may store the retrieved data in the memory bank (e.g., memory bank 220), ensuring that the extracted data is preserved and organized for subsequent processing and analysis. In some embodiments, the data extraction module may be configured to extract the data from the scan chains and the RAMs based on a first set of parameters, as described herein. Finally, at step 308, the data extraction module 212 may complete its operation by informing the next stage of data availability, signaling to other modules or components within the scan island that the data is ready for further processing.

As described herein, the data processing module 214 may be configured to filter and reformat the data extracted from the IC 120. At step 310, the data processing module 214 may read data from the memory bank (e.g., memory bank 220), accessing the information previously extracted and stored by the data extraction module 212. Next, at step 312, the data processing module 214 may filter the data, applying specific criteria or rules to isolate relevant information or exclude unnecessary details. In some embodiments, this filtering may be based on security and isolation policies associated with the scan island. Following the filtering, at step 314, the data processing module 214 may re-format the data, converting it from its initial format to a standardized format that facilitates subsequent analysis or transmission. Then, at step 316, the data processing module 214 may store the processed data in the memory bank, preserving the refined and restructured information for further use. Finally, at step 318, the data processing module 214 may complete its operation by informing the next stage of data availability, signaling to other modules or components within the scan island that the processed data is ready for further actions such as compression, encryption, or transmission.

As described herein, the data compression module 216 may be configured to compress the data extracted from the IC 120. At step 320, the data compression module 216 may read data from the memory bank (e.g., memory bank 220), accessing the information that has been processed and stored by the preceding stages (e.g., data processing module 214). Next, at step 322, the data compression module 216 may compress the data, applying specific algorithms or techniques to reduce its size without losing essential information. Such compression may be useful for efficient storage and transmission, particularly when dealing with large volumes of data. Following the compression, at step 324, the data compression module 216 may store the compressed data in the memory bank, ensuring that the more compact form of the data is preserved for subsequent actions such as encryption or transmission. Finally, at step 326, the data compression module 216 may complete its operation by informing the next stage of data availability, signaling to other modules or components within the scan island that the compressed data is ready for further processing.

As described herein, the data security module 206 may be configured to secure data extracted from the IC 120. At step 328, the data security module 206 may read data from the memory bank (e.g., memory bank 220), accessing the information that has been compressed and stored by the preceding stages. Next, at step 330, the data security module 206 may encrypt the data, applying specific cryptographic algorithms to ensure the confidentiality and integrity of the information. Such encryption may be useful for protecting the data against unauthorized access or alteration. Following the encryption, at step 332, the data security module 206 may attest the data, such as by using a verification mechanism that ensures the authenticity and integrity of the data, thereby preventing spoofing attacks on the extracted data. In addition, the data security module 206 may provide permissioned access to the data based on data ownership among multiple users, thereby providing a robust layer of security. Then, at step 334, the data security module 206 may store the encrypted and attested data in the memory bank, preserving the secured form of the data for subsequent transmission or analysis. Finally, at step 338, the data security module 206 may complete its operation by informing the next stage of data availability, signaling to other modules or components within the scan island that the encrypted and attested data is ready for further actions such as transmission to the OEM server for post-event analysis.

As described herein, the input/output circuitry 208 may be configured to manage data transmission associated with the IC 120. At step 340, the input/output circuitry 208 may read data from the memory bank (e.g., memory bank 220), accessing the information that has been encrypted, attested, and stored by the preceding stages. This data may represent the final processed form of the information extracted from the IC, which should be ready for external transmission. Next, at step 342, the input/output circuitry 208 may transmit the data for storage to an external non-volatile storage, ensuring that the data is preserved in a stable and secure form outside of the scan island. The external storage may provide a robust repository for the data, facilitating subsequent retrieval and analysis by authorized parties such as the OEM server. In some embodiments, the transmission may involve specific protocols or interfaces to maintain the security and integrity of the data during the transfer.

Example Method for Automated Data Retrieval from an IC

Figure 4:
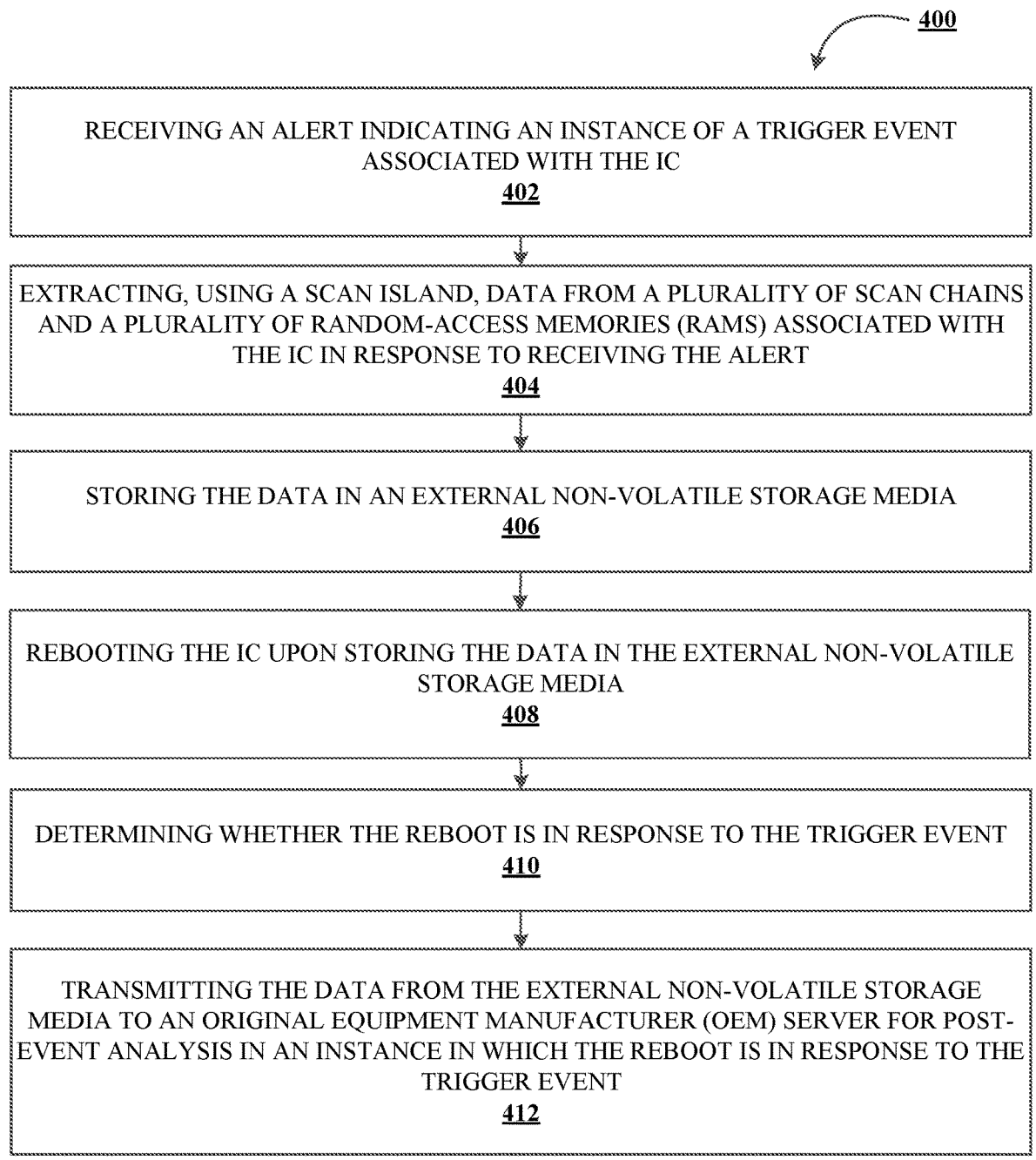
FIG. 4 illustrates an example method for automated data retrieval from an integrated circuit (IC), in accordance with an embodiment of the invention.

FIG. 4 illustrates an example method 400 for automated data retrieval from an integrated circuit (IC), in accordance with an embodiment of the invention. As shown in block 402, the method may include receiving an alert indicating an instance of a trigger event associated with the IC. In some embodiments, the alert may be generated by monitoring systems that can detect anomalies or malfunctions with the IC, initiating the response process. In some embodiments, the alert may manifest as a digital signal or notification sent by the monitoring systems to the system (e.g., system 102), serving as an indication that a trigger event, such as an anomaly or malfunction, has occurred within the IC.

As shown in block 404, the method may include extracting, using a scan island, data from a plurality of scan chains and a plurality of RAMs associated with the IC in response to receiving the alert. As described herein, the scan island, a partition of the IC isolated for data retrieval, may utilize the data extraction module to retrieve specific information from interconnected registers (scan chains) and RAMs, providing insights into various operational states and conditions within the IC. In some embodiments, the data extracted from the scan chains and the RAMs may include information associated with the trigger event. For example, the information associated with the trigger event may include information associated with the IC, such as general data related to the integrated circuit, such as its model, manufacturer, serial number, or other identifying characteristics used for tracking, auditing, or diagnostic purposes. In another example, the information associated with the trigger event may include a debug configuration state of the IC, such as specific settings, parameters, or states related to debugging functions within the IC. The debug configuration state may include details about active debug modes, breakpoints, watchpoints, or other diagnostic tools that were engaged at the time of the trigger event. In yet another example, the information associated with the trigger event may include a configuration state of one or more components of the IC, including settings and states of individual components within the IC, such as processors, memory units, or peripheral devices that may reveal how each component was set up and operating at the time of the trigger event. In still other examples, the information associated with the trigger event may include firmware and/or software measurements of the one or more components of the IC, such as performance metrics, version information, or other data related to the firmware or software running on the IC's components. In still other examples, the information associated with the trigger event may include an error state that captures specific details about any errors, faults, or exceptions that occurred within the IC at the time of the trigger event. Here, the error state may include error codes, descriptions, timestamps, or other diagnostic information that can pinpoint the nature and origin of the problem. In yet another example, the information associated with the trigger event may include configuration information associated with the scan island.

Figure 6:
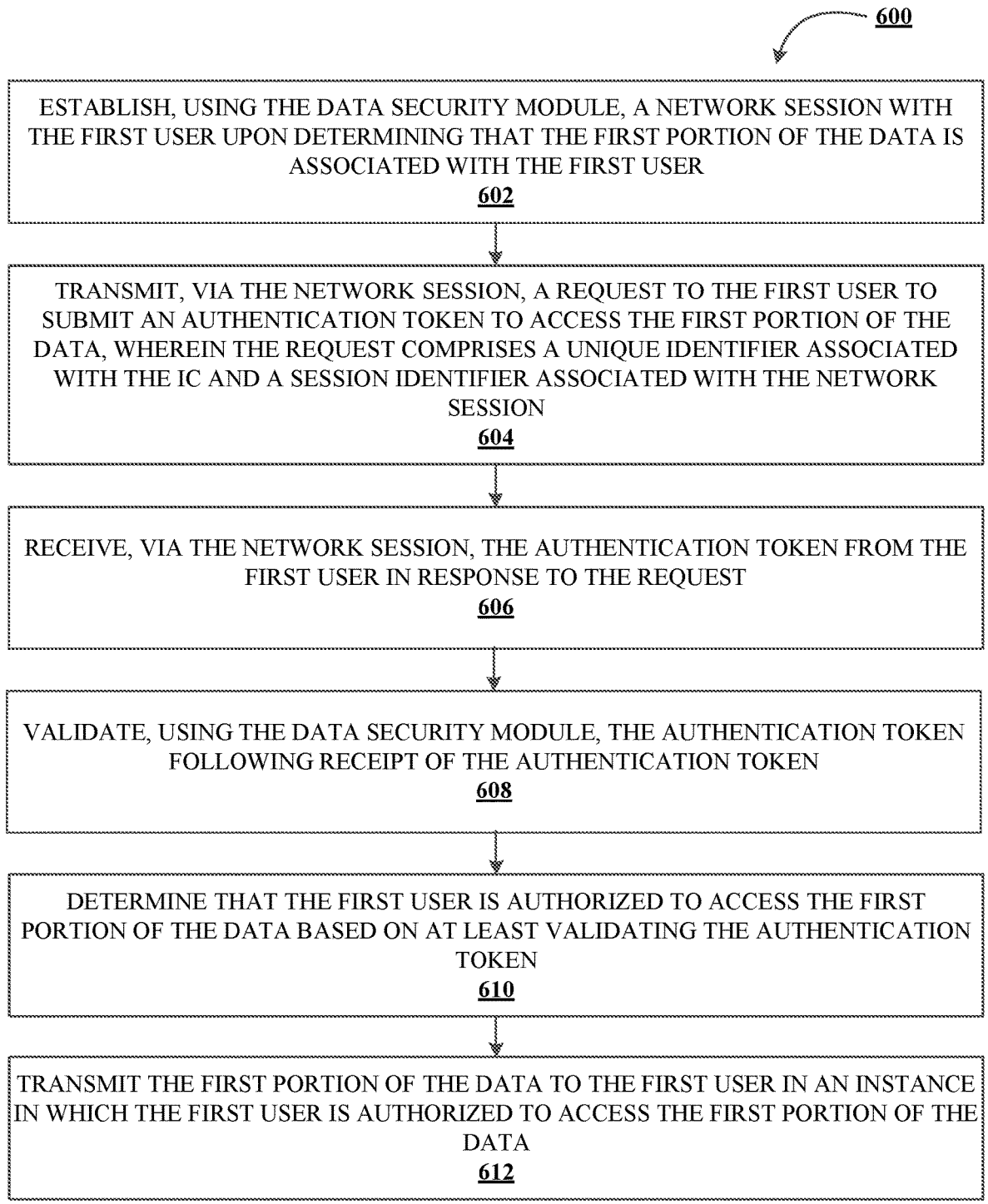
FIG. 6 illustrates an example method for authenticating a first user for data access, in accordance with an embodiment of the invention.

In some embodiments, the data extraction process may depend on various factors, including data ownership and specific parameters defined by the users who own the data, as described in further detail in FIG. 6. These parameters can dictate how the data is to be extracted, processed, and transmitted, ensuring that the extraction aligns with the user's requirements, legal obligations, and security considerations. Additionally, the parameters may provide a framework for customization, allowing for the adaptation of the extraction process to different needs and scenarios. Furthermore, as described herein, the data extracted from the scan chains and the RAMs may undergo post-extraction data processing such as data filtering and re-formatting, data compression, data encryption and attestation, and/or the like.

As shown in block 406, the method may include storing the data in an external non-volatile storage media. Upon processing, the input/output circuitry may transmit the data to the external non-volatile storage media, ensuring stable and secure preservation.

As shown in block 408, the method may include rebooting the IC upon storing the data in the external non-volatile storage media. In some embodiments, this reboot may be part of a recovery process and may serve to reset the IC to a functional state.

As shown in block 410, the method may include determining whether the reboot is in response to the trigger event. This determination ensures that the data transmission to the OEM server is specifically linked to the identified trigger event, maintaining the relevance and accuracy of the post-event analysis.

As shown in block 412, the method may include transmitting the data from the external non-volatile storage media to an original equipment manufacturer (OEM) server for post-event analysis in an instance in which the reboot is in response to the trigger event. In some embodiments, if the reboot is indeed in response to the trigger event, then the data is transmitted to the OEM server for post-event analysis, facilitating diagnostics, troubleshooting, and potential improvements to the IC's design or operation. On the other hand, in embodiments where the reboot is not in response to the trigger event (e.g., the reboot is performed as part of the IC's regular operation), the data is not transmitted from the external non-volatile storage media to the OEM server.

Example Method for Managing Data Extraction from an IC

Figure 5A:
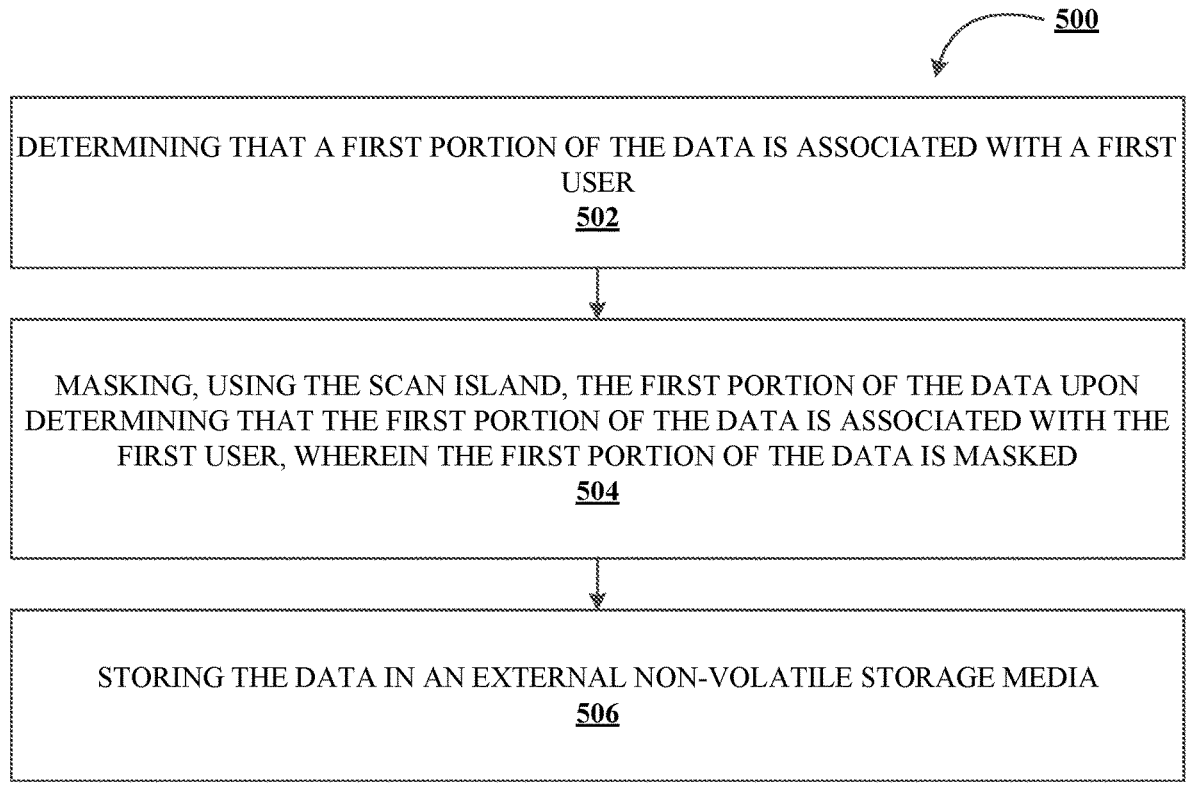
FIGS. 5A and 5B illustrate example methods and for managing data extraction from an integrated circuit (IC), in accordance with an embodiment of the invention.
Figure 5B:
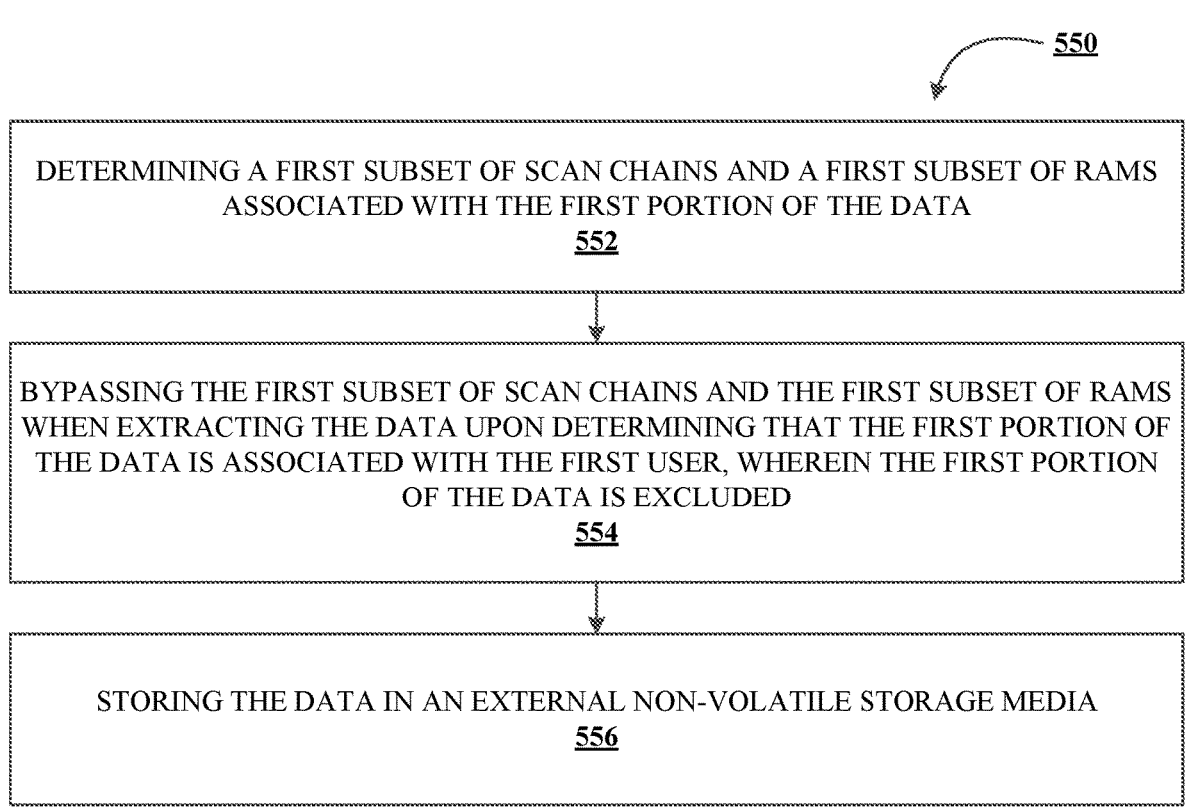

FIGS. 5A and 5B illustrate example methods 500 and 550 for managing data extraction from an integrated circuit (IC), in accordance with an embodiment of the invention. FIG. 5A illustrates an example method for masking data during data extraction, focusing on the concealment of specific data portions associated with individual users or clients extracted from the IC. As shown in block 502, the method may include determining, using the data security module, that a first portion of the data is associated with a first user. It is not uncommon for an IC, depending on its particular state, to possess data that belongs to a specific user and requires concealment. In such scenarios, depending on the regions within the IC where client data might be present, and contingent on the state of the IC, the method may include implementing applicable data concealment techniques to mask such data, allowing for dynamic adaptation to the varying needs of data security and user privacy.

As shown in block 504, the method may include masking, using the scan island, the first portion of the data upon determining that the first portion of the data is associated with the first user, wherein the first portion of the data is masked. In some embodiments, to mask the first portion of the data, the method may employ a dynamic mask pattern generator (DMPG) to generate a specific pattern, such as a sequence of zeros or a random sequence, that effectively masks or conceals a first portion of the data extracted from the IC. The DPMG may be configured and optimized according to the specific characteristics of the scan chain, such as the length of the region that needs to be concealed. This allows for precise control over the masking process, enabling real-time adjustments or "ad-hoc" changes to the concealment configuration. The arming or disarming of the DPMG can be decided at run time, providing flexibility and responsiveness to the varying requirements of data security and concealment within the system. By employing the DPMG, the method may ensure that sensitive or client-specific data is protected from unauthorized access or exposure.

As shown in block 506, the method may include storing the data in an external non-volatile storage media. The external non-volatile storage provides a secure and reliable means of preserving the data, facilitating its transmission to other components such as an original equipment manufacturer (OEM) server for post-event analysis, or enabling further processing within the scan island or other parts of the system. The storage process may also include specific measures to ensure data security, such as through implementing encryption or access controls, further enhancing the confidentiality and integrity of the stored data.

FIG. 5B illustrates an example method for bypassing a subset of scan chains and RAMs during data extraction focusing on selective data extraction based on data ownership. As shown in block 552, the method may include determining a first subset of scan chains and a first subset of RAMs associated with the first portion of the data. In some embodiments, the first subset of scan chains and/or the first subset of RAMs are identified to contain the first portion of the data (e.g., sensitive or confidential client data).

As shown in block 554, the method may include bypassing the first subset of scan chains and the first subset of RAMs when extracting the data upon determining, using the data security module, that the first portion of the data is associated with the first user, wherein the first portion of the data is excluded. In some embodiments, as an alternative to masking data using DMPG, Dynamic Sub-chain Bypass Control (DSBC) may be used to bypass or skip specific registers (e.g., first subset of scan chains and first subset of RAMs) in the scan chain during the scanning and data extraction process. By bypassing these registers during the scanning and data extraction process, the first portion of the data (e.g., client data) is effectively skipped over, and thus concealed from the scanning process.

As shown in block 556, the method may include storing the data in an external non-volatile storage media.

The choice between using masking techniques, such as DMPG, register bypass techniques, such as DSBC, may depend on various factors such as the specific requirements for data concealment, the design of the IC, area optimization considerations, the desired level of granularity in control, and/or the like. Both masking and bypassing provide mechanisms to prevent unauthorized access to client data within the IC. By either masking the data with DMPG or bypassing it with DSBC, sensitive information can be protected from potential exposure or misuse. For example, in situations that require a more space-efficient option, DSBC is a preferred choice as it offers the advantage of a minimal spatial and computational requirements.

Example Method for Authenticating a First User for Data Access Using a Data Security Module FIG. 6 illustrates an example method 600 for authenticating a first user for data access, in accordance with an embodiment of the invention. In some embodiments, the method may be used to ensure that the data extracted from the IC may only be accessed by entities possessing the proper authorization, in compliance with predetermined rules and regulations. In specific embodiments, multiple parties (e.g., users or clients) may have an interest in the specific portions of the data. Each of these parties may possess distinct rights and permissions concerning specific portions of the data. In such cases, the data security module may be configured to navigate these complexities to ensure that the portions of the data remain visible only to the designated party, employing a combination of encryption, authentication, and other security protocols.

As shown in block 602, the method may include establishing, using the data security module, a network session with the first user upon determining that the first portion of the data is associated with the first user. Establishing the network session may ensure a secure connection between the system and/or the IC, and the authorized user (e.g., the first user), facilitating a controlled environment for data access. In specific embodiments, the network session may be encrypted or otherwise secured to prevent unauthorized access.

As shown in block 604, the method may include transmitting, via the network session, a request to the first user to submit an authentication token to access the first portion of the data, wherein the request comprises a unique identifier associated with the IC and a session identifier associated with the network session.

As shown in block 606, the method may include receiving, via the network session, the authentication token from the first user in response to the request. In some embodiments, the authentication token may include the session identifier, the unique identifier, and/or a first set of parameters for extraction of the data. Here, the session identifier may refer to a unique value associate with the network session established with the first user, which may serve as a reference to identify and manage the specific communication session, thereby ensuring that the data exchange is consistent and secure. The unique identifier associated with the IC may refer to a serial number, a hardware ID, or another unique attribute that identifies the specific IC. By including the unique identifier in the authentication token, the system can verify that the request pertains to the correct IC and prevent unauthorized access to other devices. The first set of parameters for extraction of the data may refer to specific rules, conditions, or methods for extracting the data from the IC. These parameters may include specifications about specific data to extract, data formatting requirements, data transmission parameters, or other operational details.

In some embodiments, the authentication token may be signed by the first user using a first private key. The resulting digital signature generated by the first private key may serve as a cryptographic seal, confirming the integrity of the authentication token and establishing the identity of the first user. The first private key may be a critical component of a cryptographic key pair, securely stored and exclusively controlled by the first user. The corresponding public key (e.g., first public key), stored in a secure area of the IC, may be used to verify the digital signature on the authentication token.

As shown in block 608, the method may include validating, using the data security module, the authentication token following receipt of the authentication token. The validation process may involve several steps to ensure the authenticity and integrity of the token. In specific embodiments, the validation process may include verifying the digital signature of the first user, checking the token's expiration date, and ensuring that the token has not been revoked. In specific embodiments, the digital signature may be verified using the corresponding public key (e.g., the first public key) associated with the first user. Successful verification may authenticate the first user and confirm the legitimacy of the authentication token. Additionally or alternatively, the validation may include comparing the unique identifier associated with the IC and the session identifier associated with the network session, both of which are contained within the token, against known and expected values. These checks help confirm that the token is legitimate and has been issued by a trusted entity, and that it pertains to the correct IC and network session. If any of these validation checks fail, the token may be rejected, and access to the first portion of the data may be denied. Successful validation of the authentication token confirms that the first user is authorized to access the first portion of the data.

As shown in block 610, the method may include determining that the first user is authorized to access the first portion of the data based on at least validating the authentication token. Such a determination is made based on successful validation confirming that the user has the necessary permissions to access the specified data.

Upon successfully authenticating the first user, in some embodiments, the method may include extracting, using the data extraction module, the first portion of the data from the IC. Here, the extraction of the first portion of the data is conducted in accordance with the first set of parameters, delineating the specific data to be extracted, the method of extraction, and the desired format. Upon extracting the first portion of the data, the method may include attesting, using the data security module, the first portion of the data. Attestation may refer to the process of verifying the integrity and authenticity of the data, ensuring that the data has not been altered or tampered with since its extraction from the IC. In example embodiments, attestation may be achieved by generating a cryptographic hash or checksum of the first portion of the data and then digitally signing the hash. The resulting digital signature may serve as a secure and verifiable proof of the data's integrity at the time of attestation. The attestation process provides an additional layer of security and trust, reinforcing the confidence in the accuracy and reliability of the data being accessed.

In some embodiments, once attested, the first portion of the data may then be encrypted using the data security module. In this regard, the method may include generating, using the data security module, an encryption key that may be used to encrypt the first portion of the data. The encryption key may be produced to ensure uniqueness and security, in accordance with established cryptographic standards. Once produced, the method may include encrypting the first portion of the data utilizing a specified encryption algorithm, thereby transforming the data into a secure format. To further enhance security, the method may include encrypting the encryption key itself using the first public key associated with the first user, thereby ensuring that the encryption key is accessible only to the holder of the corresponding private key (e.g., the first user).

As shown in block 612, the method may include transmitting the first portion of the data to the first user in an instance in which the first user is authorized to access the first portion of the data. Here, both the encrypted first portion of the data and the encrypted encryption key may be transmitted to the first user. Upon receipt, the first user may decrypt the encryption key using a private key that corresponds to the public key that was previously used to encrypt the encryption key. Once the encryption key is obtained, it can be used to decrypt the encrypted first portion of the data, thereby granting the first user access to the first portion of the data in its original form.

In instances where the data extracted from the IC is associated with multiple users, the method may include determining that one or more portions of the data are associated with one or more users. Following this determination, the method may include utilizing the data security module to determine whether the one or more users are authorized to access the one or more portions of the data. The authorization process may be distinct for each user and the specific portion of the data they are claiming access to. In some embodiments, the authorization process may involve validating the authentication token, verifying user credentials, checking access permissions, ensuring compliance with any applicable legal or contractual obligations, and/or the like. In example embodiments, validating the authentication token may include verifying the digital signature of each user, checking the token's expiration date, and ensuring that the token has not been revoked. As described herein, the authentication token may be signed by each user using their respective private keys. The digital signature of each user may be independently verified using corresponding public keys associated with each user. Successful verification may authenticate each user and confirm the legitimacy of the authentication token. In some embodiments, the authorization process may also consider the context of the request, such as the current state of the IC, the nature of the trigger event, or other situational factors that may affect access rights. Additional security measures, such as multi-factor authentication or encryption, may be employed to further safeguard the data.

If the one or more users are determined to be authorized to access the one or more portions of the data, the method may include transmitting the corresponding portions of the data to the authorized users. This transmission may be conducted securely, using encryption or other security protocols, and may be tailored to each user's specific access rights and needs. By implementing this multi-user authorization process, the method ensures that each party is authenticated for the specific portion of the data they are claiming access to, maintaining the confidentiality, integrity, and appropriate distribution of the information. This approach allows for fine-grained control over data access, accommodating complex scenarios where multiple authorized parties are involved, each with potentially different rights and permissions concerning the data.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination, and some steps may be performed in parallel.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automated data retrieval from an integrated circuit (IC), the system comprising:
   a processing device configured to communicate with the IC;
   a non-transitory storage device containing instructions that, when executed by the processing device, cause the processing device to:
      receive an alert indicating a trigger event associated with the IC;
      extract, using a scan island, data from a plurality of scan chains and a plurality of random-access memories (RAMs) associated with the IC in response to receiving the alert; and
      store the data in an external non-volatile storage media, wherein the scan island is a partition of the IC that is isolated for data retrieval.

2. The system of claim 1, wherein the trigger event comprises at least a malfunction of the IC.

3. The system of claim 1, wherein the data comprises information associated with the trigger event, wherein the information comprises at least one of information associated with the IC, a debug configuration state of the IC, a configuration state of one or more components of the IC, firmware and/or software measurements of the one or more components of the IC, an error state, or configuration information associated with the scan island.

4. The system of claim 1, wherein the instructions, when executed by the processing device, further cause the processing device to:
   reboot the IC upon storing the data in the external non-volatile storage media.

5. The system of claim 4, wherein the instructions, when executed by the processing device, further cause the processing device to:
   determine whether the reboot is in response to the trigger event; and
   transmit the data from the external non-volatile storage media to an original equipment manufacturer (OEM) server for post-event analysis in an instance in which the reboot is in response to the trigger event.

6. The system of claim 1, wherein the instructions, when executed by the processing device, further cause the processing device to:
   determine that a first portion of the data is associated with a first user;
   mask, using the scan island, the first portion of the data upon determining that the first portion of the data is associated with the first user, wherein the first portion of the data is masked using a dynamic mask pattern generator, wherein the first portion of the data is dynamically masked during extraction of the data; and
   store the data in an external non-volatile storage media, wherein the first portion of the data is masked.

7. The system of claim 6, wherein the instructions, when executed by the processing device, further cause the processing device to:
   determine a first subset of scan chains and a first subset of RAMs associated with the first portion of the data;
   bypass the first subset of scan chains and the first subset of RAMs when extracting the data upon determining that the first portion of the data is associated with the first user; and
   store the data in an external non-volatile storage media, wherein the first portion of the data is excluded.

8. The system of claim 6, wherein the instructions, when executed by the processing device, further cause the processing device to:
   determine, using a data security module, whether the first user is authorized to access the first portion of the data; and
   transmit the first portion of the data to the first user in an instance in which the first user is authorized to access the first portion of the data,
   wherein the data security module is associated with the scan island.

9. The system of claim 8, wherein the instructions, when executed by the processing device, further cause the processing device to:
   establish, using the data security module, a network session with the first user upon determining that the first portion of the data is associated with the first user;
   transmit, via the network session, a request to the first user to submit an authentication token to access the first portion of the data, wherein the request comprises a unique identifier associated with the IC and a session identifier associated with the network session;
   receive, via the network session, the authentication token from the first user in response to the request;
   validate, using the data security module, the authentication token following receipt of the authentication token; and
   determine that the first user is authorized to access the first portion of the data based on at least validating the authentication token.

10. The system of claim 9, wherein the authentication token comprises at least one of the session identifier, the unique identifier, a first set of parameters for extraction of the data, or a digital signature of the first user, wherein the digital signature of the first user is generated using a first private key associated with the first user.

11. The system of claim 8, wherein the instructions, when executed by the processing device, further cause the processing device to:
   extract, using a data extraction module, the first portion of the data based on at least the first set of parameters upon receiving the alert;
   generate, using the data security module, an encryption key;
   encrypt, using the data security module, the first portion of the data using the encryption key;
   encrypt, using the data security module, the encryption key using a first public key associated with the first user; and
   transmit the encrypted first portion of the data and the encrypted encryption key to the first user.

12. The system of claim 11, wherein the instructions, when executed by the processing device, further cause the processing device to:

attest the first portion of the data prior to encrypting the first portion of the data using the encryption key, thereby ensuring integrity of the data.

13. The system of claim 8, wherein the instructions, when executed by the processing device, further cause the processing device to:

determine that one or more portions of the data is associated with one or more users;

determine, using the data security module, whether the one or more users is authorized to access the one or more portions of the data; and transmit the one or more portions of the data to the one or more users in an instance in which the one or more users is authorized to access the one or more portions of the data.

14. The system of claim 1, wherein the instructions, when executed by the processing device, further cause the processing device to:

filter the data, using a data processing module, based on at least security and isolation policies associated with the scan island; and reformat the data, using the data processing module, from an initial format to a standardized format upon filtering the data, wherein the data processing module is associated with the scan island.

15. The system of claim 1, wherein the instructions, when executed by the processing device, further cause the processing device to:

compress the data, using a data compression module, thereby reducing a size of the data, wherein the data compression module is associated with the scan island.

16. A method for automated data retrieval from an integrated circuit (IC), the method comprising:

receiving an alert indicating an instance of a trigger event associated with the IC;

extracting, using a scan island, data from a plurality of scan chains and a plurality of random-access memories (RAMs) associated with the IC in response to receiving the alert; and storing the data in an external non-volatile storage media, wherein the scan island is a partition of the IC that is isolated for data retrieval.

17. The method of claim 16, wherein the trigger event comprises at least a malfunction of the IC.

18. The method of claim 16, wherein the data comprises information associated with the trigger event, wherein the information comprises at least one of information associated with the IC, a debug configuration state of the IC, a configuration state of one or more components of the IC, firmware and/or software measurements of the one or more components of the IC, an error state, or configuration information associated with the scan island.

19. The method of claim 16, wherein the method further comprises:

rebooting the IC upon storing the data in the external non-volatile storage media.

20. The method of claim 19, wherein the method further comprises:

determining whether the reboot is in response to the trigger event; and transmitting the data from the external non-volatile storage media to an original equipment manufacturer (OEM) server for post-event analysis in an instance in which the reboot is in response to the trigger event.

21. A computer program product for automated data retrieval from an integrated circuit (IC), the computer program product comprising a non-transitory computer-readable medium comprising code configured to cause an apparatus to:

receive an alert indicating an instance of a trigger event associated with the IC;

extract, using a scan island, data from a plurality of scan chains and a plurality of random-access memories (RAMs) associated with the IC in response to receiving the alert; and store the data in an external non-volatile storage media, wherein the scan island is a partition of the IC that is isolated for data retrieval.

22. The computer program product of claim 21, wherein the trigger event comprises at least a malfunction of the IC.

23. The computer program product of claim 21, wherein the data comprises information associated with the trigger event, wherein the information comprises at least one of information associated with the IC, a debug configuration state of the IC, a configuration state of one or more components of the IC, firmware and/or software measurements of the one or more components of the IC, an error state, or configuration information associated with the scan island.

24. The computer program product of claim 21, wherein the code is further configured to cause the apparatus to:

reboot the IC upon storing the data in the external non-volatile storage media.

25. The computer program product of claim 24, wherein the code is further configured to cause the apparatus to:

determine whether the reboot is in response to the trigger event; and transmit the data from the external non-volatile storage media to an original equipment manufacturer (OEM) server for post-event analysis in an instance in which the reboot is in response to the trigger event.

26. The computer program product of claim 21, wherein the code is further configured to cause the apparatus to:

determine that a first portion of the data is associated with a first user;

mask, using the scan island, the first portion of the data upon determining that the first portion of the data is associated with the first user, wherein the first portion of the data is masked using a dynamic mask pattern generator, wherein the first portion of the data is dynamically masked during extraction of the data; and store the data in an external non-volatile storage media, wherein the first portion of the data is masked.

* * * * *